United States Patent [19]

Franz

[11] 4,339,697

[45] Jul. 13, 1982

[54] PROPULSION MOTOR CONTROL APPARATUS AND METHOD

[75] Inventor: James H. Franz, Murrysville, Pa.

[73] Assignee: Westinghouse Electric Corp., Pittsburgh, Pa.

[21] Appl. No.: 149,358

[22] Filed: May 13, 1980

[51] Int. Cl.³ .............................................. H02P 5/16
[52] U.S. Cl. .................................. 318/341; 318/139; 318/345 G; 318/345 C; 363/41
[58] Field of Search .................. 363/41; 318/809, 810, 318/811, 341, 345 C, 345 G, 139

[56] References Cited

U.S. PATENT DOCUMENTS

| 4,042,873 | 8/1977 | Cox | 363/129 |
| 4,099,109 | 7/1978 | Abbondanti | 318/811 |
| 4,190,882 | 2/1980 | Chevalier et al. | 363/26 |

Primary Examiner—David Smith, Jr.
Attorney, Agent, or Firm—R. G. Brodahl

[57] ABSTRACT

There is disclosed a motor control chopper apparatus and method having a random frequency of operation with a long term average deviation of substantially zero to reduce the average magnitude of the chopper apparatus generated noise signals.

10 Claims, 9 Drawing Figures

PROPULSION MOTOR CONTROL APPARATUS AND METHOD

CROSS-REFERENCE TO RELATED APPLICATION

The present invention is related to a previously filed patent application Ser. No. 097,275, filed Nov. 26, 1979 by J. H. Franz, Jr. and entitled "Brake Control Apparatus and Method", which is assigned to the same assignee and the disclosure of which is incorporated herein by reference.

BACKGROUND OF THE INVENTION

The present invention relates to reducing the harmonic noise generated by a propulsion motor control chopper apparatus in relation to receiving the input control signal frequencies for a transit vehicle, such as are provided for vehicle detection and control within individual track signal blocks as described in an article published in the Westinghouse Engineer for September 1972 at pages 145 to 151. The input speed command signals at known frequencies are received from the roadway track circuit signal blocks and pass through bandpass filters to detect the respective one and zero portions of the speed command as disclosed in U.S. Pat. No. 3,810,161 of A. P. Sahasrabudhe. A suitable bandpass filter per se is shown in U.S. Pat. No. 4,016,517 of Sahasrabudhe and Matty. Propulsion motors have been controlled by a software program controlled microprocessor as disclosed in U.S. Pat. Nos. 4,090,115 of J. H. Franz, 4,095,153 of T. C. Matty and J. H. Franz, and 4,123,693 of L. W. Anderson and J. H. Franz.

In an article entitled "Propulsion Control for Passenger Trains Provides High Speed Service" that was published in the Westinghouse Engineer for September 1970 at pages 143 to 149 there is discussed the operation of the p signal to establish the requested tractive effort of the vehicle.

It is desired that a fixed average frequency control of the propulsion motor current determining chopper apparatus be provided, since by experience this gives a reliable propulsion motor operation in relation to average heating characteristics of the motors and the associated chopper apparatus. This fixed frequency of the chopper apparatus provides known harmonic sidebands in regard to the control signal bandpass filters for sensing the input control signalling frequencies.

SUMMARY OF THE INVENTION

When a given propulsion chopper apparatus might have to operate with a plurality of known different control signal frequencies it is desired that the average level of all harmonic noise sidebands be reduced in relation to the provided bandpass filter thresholds for those input control signal frequencies.

The present invention operates to randomize the frequency of the chopper apparatus and thereby to reduce the average level of the chopper generated noise harmonic sideband frequencies going through the control signal bandpass filters by a desired level, such as greater than 6 db. This makes the input control signals stronger in relation to chopper generated noise and permits the control signal bandpass filters to sense more reliably the input control signals.

DESCRIPTION OF THE PREFERRED EMBODIMENT

Figure 1:
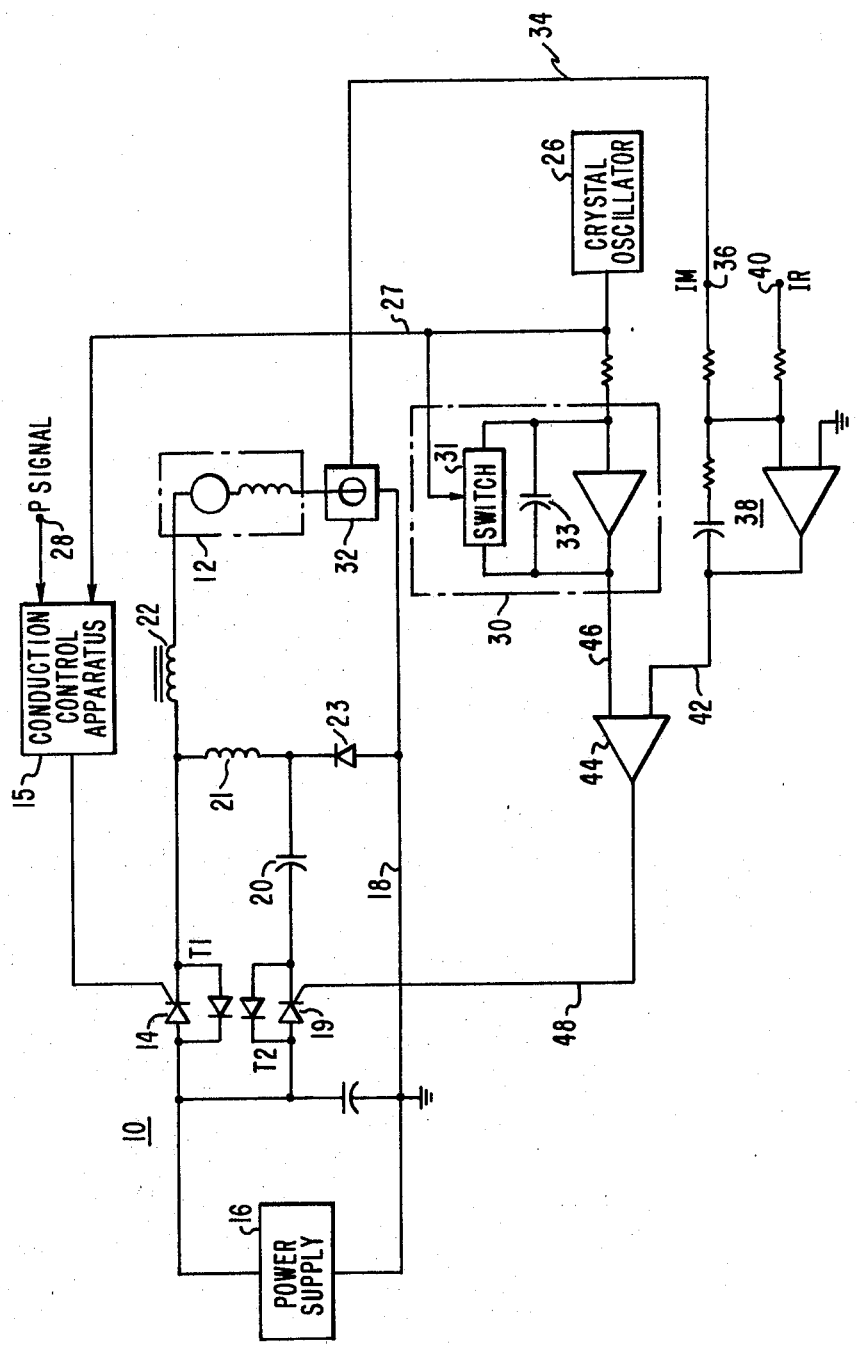
FIG. 1 schematically shows a prior art transit vehicle propulsion motor control apparatus.

In FIG. 1 there is shown a prior art operation control circuit for a transit vehicle propulsion motor control chopper apparatus. In the motoring mode the chopper 10 regulates the current in the motor circuit 12. When the main thyristor 14 of the chopper 10 is turned on, by the conduction control apparatus 15 in response to an effort request P signal, this builds up current in the motor circuit 12 by completing the circuit from the positive side of the D.C. power supply 16 through the motor circuit 12 to ground return 18 and then to the negative side of the power supply 16. When the main thyristor 14 of the chopper is turned off by the commutating thyristor 19 operative with the commutating capacitor 20 and the inductor 21, the energy stored in the motor reactor 22 and the inductance of the motor circuit 12 maintains the current flow in the motor circuit 12 through the free wheeling diode 23. The average voltage applied to the motor circuit 12 is controlled by adjusting the ratio of the chopper OFF time to the chopper ON time. This adjustment is made by the conduction control apparatus 15 to maintain the desired average motor current and hence the desired motor torque as described in an article published in the Westinghouse Engineer for March 1973 at pages 34 to 41.

The crystal oscillator 26 provides a control signal at a predetermined rate, such as 218 hertz, to the conduction apparatus 15 to fire ON the main thyristor 14 as required in accordance with the effort request P signal supplied on input 28. The crystal oscillator 26 also provides a control signal at the same predetermined rate to the sawtooth generator 30. The actual current IM in the motor circuit 12 is sensed by a current transducer 32, such as a Hall effect device, and a current signal 34 is supplied to a first input 36 of the phase control error circuit 38. A second input 40 of the error circuit 38 receives a current request signal IR in accordance with the P signal, the sensed vehicle speed and the sensed vehicle weight. There is a proportional plus integral operation by the error circuit 38 to establish the difference error 42 between the actual motor current IM at input 36 and the requested motor current IR at input 40. The comparator 44 operates to compare the error signal 42 with the sawtooth ramp signal 46, and where the error signal 42 intersects the ramp signal 46 establishes when the OFF pulse 48 is provided to fire ON the commutator thyristor 19 and to turn OFF the main thyristor 14. The crystal oscillator 26 determines the turn ON time of the main thyristor 14 in response to the effort request P signal 28 operative with the conduction apparatus 15 at the crystal time base such as 218 hertz. The turn OFF time of the main thyristor 14 is determined by the error signal 42 in conjunction with the ramp signal 46 as shown in FIG. 2.

Figure 2:
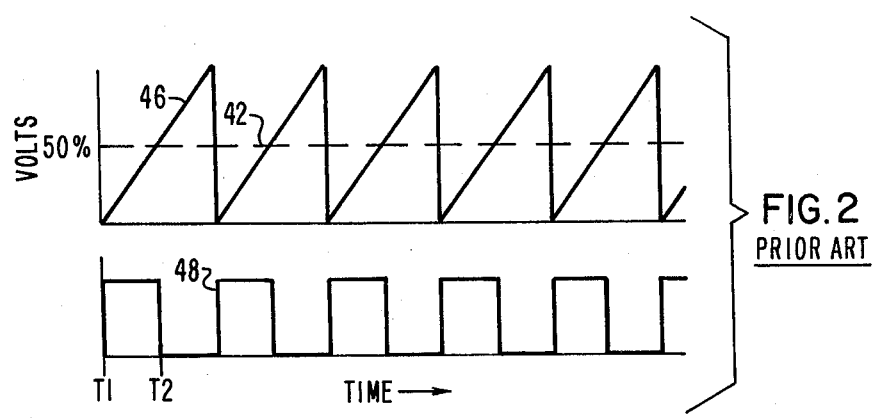
FIG. 2 shows the prior art sawtooth control waveform provided for determining the chopper apparatus operation.

The ramp signal 46 shown in FIG. 2 is provided at the crystal oscillator time base rate, for example 218 hertz. The error signal 42 has a magnitude proportional to the historical difference between the actual motor current IM and the requested motor current IR. The ramp signal 46 has a predetermined magnitude, such as 10 volts, and the error circuit 42 has a magnitude percentage relationship determined by this current difference, such as 7 volts for a 70% difference and 5 volts for a 50% difference and so forth. The crystal oscillator 26 turns ON the main thyristor 14 at time T1. The error signal 42 is shown in the example of FIG. 2 to intersect the 10 volt branch signal at a level of 5 volts, such that at time T2 the comparator 44 fires the commutating thyristor 19 to turn OFF the main thyristor 14. Since the ramp signal 46 occurs at the frequency of the crystal oscillator 46, this provides control signal 48 to establish a desired duty cycle, such as 50%, for the main thyristor 14 with each turn ON and turn OFF cycle occurring at the crystal oscillator frequency. The sawtooth generator 30 in response to the output of the crystal oscillator 26 determines the ramp frequency by opening and closing the semiconductor switch 31 and with the capacitor 33 determining the integral shape of the output ramp signal 46. The error signal 42 magnitude is supplied to comparator 44 for comparison with the magnitude of the ramp signal 46.

Figure 3:
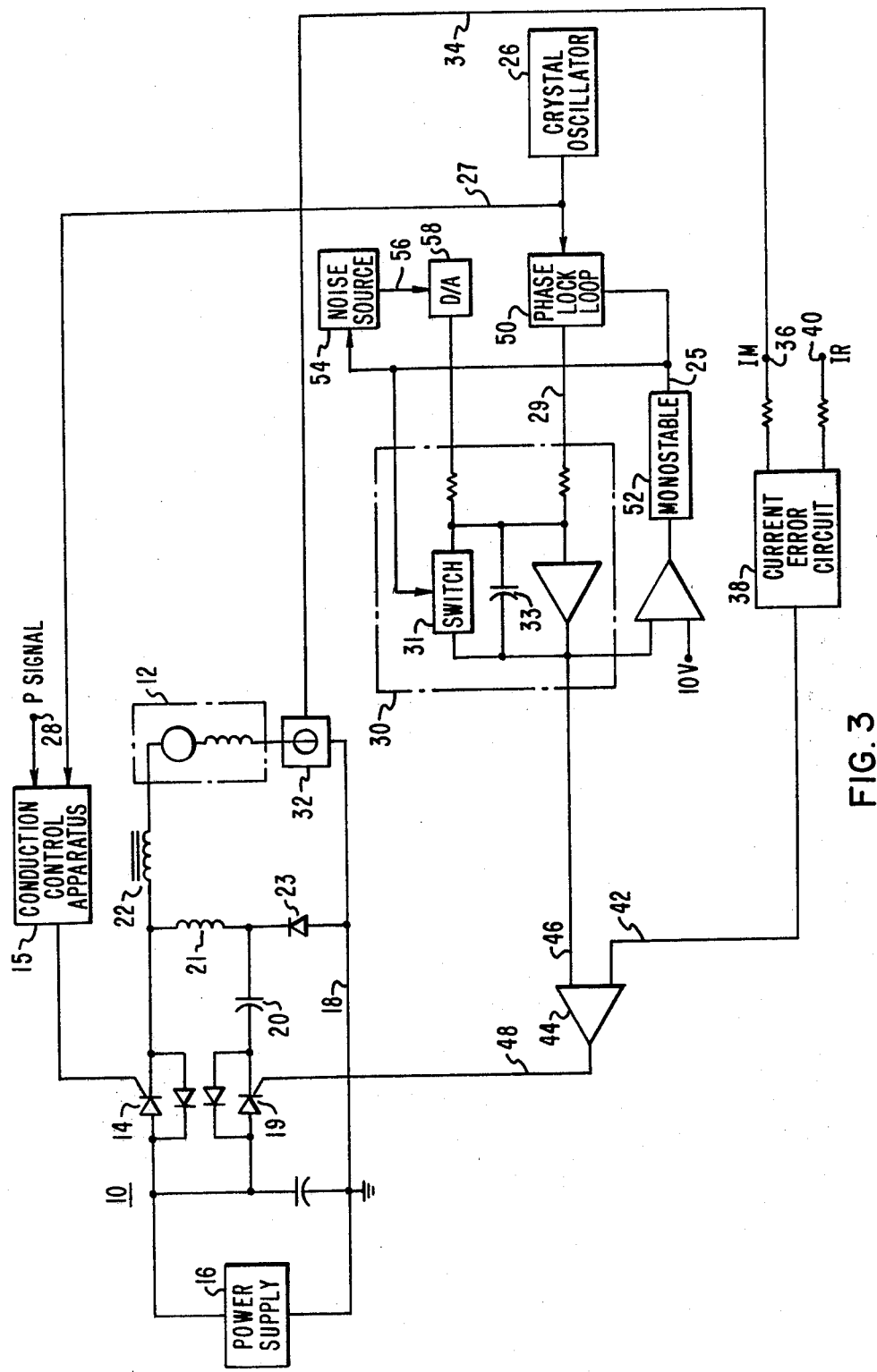
FIG. 3 schematically shows the propulsion motor control apparatus of the present invention.
Figure 8:
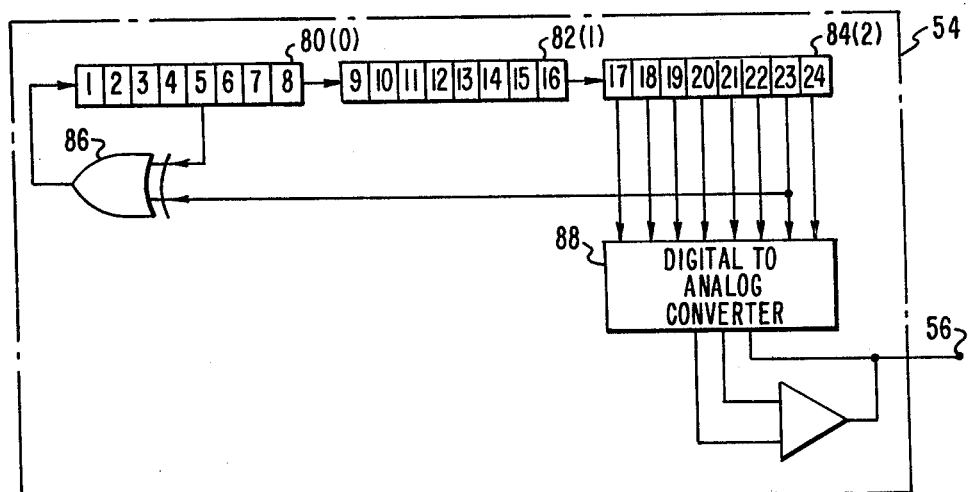
FIG. 8 shows a suitable noise source for the propulsion motor control apparatus of FIG. 3.

In FIG. 3 there is shown the propulsion motor control apparatus of the present invention, with a variable frequency control of the main thyristor 14. The output of the crystal oscillator 26 is supplied to a well known phase lock loop circuit 50, such as described in National Semiconductor Application Note 46 dated June 1971 and entitled "The Phase Locked Loop IC as a Communication System Building Block". When the ramp signal 46 reaches 10 volts, the sawtooth generator 30 is reset to zero by the output 25 of the monostable 52. The phase lock loop circuit 50 compares the output 27 from the oscillator 26 and the feedback ramp signal 25 from the monostable 52 to provide an error signal 29 to the sawtooth generator 30 to assure that the average frequency of the sawtooth ramp output 46 stays the same as the output frequency of the crystal oscillator 26. The phase lock loop 50 operates as a frequency comparer that is given a count by the ramp output 46 reaching 10 volts, with the output 25 from the monostable 52 assuring the count of the phase lock loop at this time. For long term stability of the ramp signal 46 at the frequency of the crystal oscillator 26, the error signal 29 from the phase lock loop 50 is supplied to the sawtooth generator 30. The noise source 54, which can include a software program operative with memory locations in a digital computer, as shown in FIG. 8, operates in response to the output 25 to calculate a new random output frequency deviation signal 56 for each next cycle of the main chopper and includes a sample and hold operation for the present cycle, such that the output signal 56 has a frequency deviation change every cycle but the long term average deviation is substantially zero. In this way the effect of this random output frequency signal 56 does not appear in the chopper control loop including the main thyristor 14. An error signal 42 has a voltage magnitude that determines the duty cycle of the thyristor 14 regardless of whether the present cycle output frequency signal 56 has a longer or a shorter time period than the output 27 of the crystal oscillator 26. If the ramp signal 46 is always held to the desired voltage magnitude, for example 10 volts, then for an error signal 42 of some percentage, such as 50% of that desired voltage, for example 5 volts, the duty cycle of the main thyristor is determined to be that same percentage regardless of the present cycle frequency deviation of the output 56 from the noise source 54. In this way the requested motor current IR relationship with the actual motor current IM is held as desired, since the voltage magnitude of the error signal 42 in relation to the voltage magnitude of the ramp signal 46 is held substantially constant and determines the duty cycle.

Figure 4:
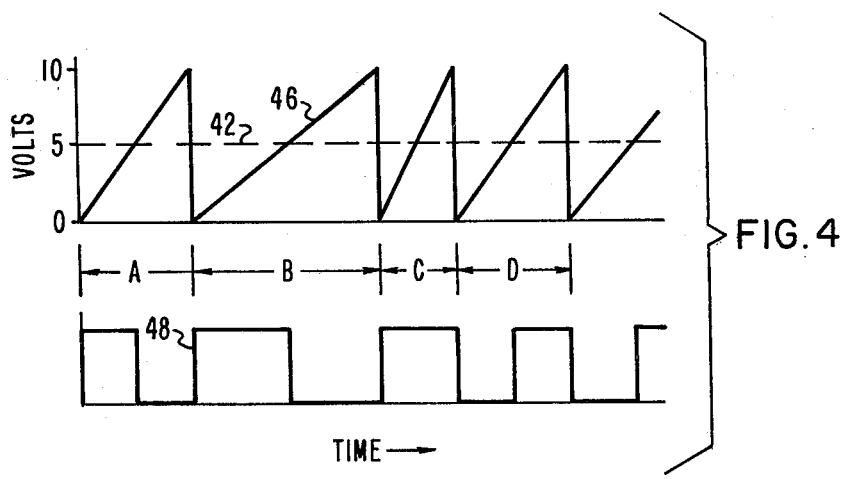
FIG. 4 shows the randomized sawtooth control waveform of the present invention.

In FIG. 4 there is shown the control ramp signal 46 determined in accordance with the present invention with each ramp signal having the same height, for example 10 volts. The error signal 42 is shown for the example of 5 volts to provide a 50% duty cycle for the main thyristor 14. The first pulse A has a time period the same as the ramp signal pulses shown in FIG. 2, the second pulse B has a longer time period, the third pulse C has a shorter time period and the fourth pulse D has about the same time period as a ramp signal pulses shown in FIG. 2. Since the magnitude of the error signal 42 has the same fractional relationship with the ramp signal 46, the control duty cycle of the main thyristor 14 will have the same fractional relationship as provided in relation to FIG. 2. For example, if the magnitude of the error signal 42 is 5 volts and the magnitude of the ramp signal is 10 volts, as shown in FIG. 4, the control signal 48 is provided to the commutating thyristor 19 to result in a 50% duty cycle control of the main thyristor 14 for each of the ramp signal pulses A, B, C and D. If the magnitude of the error signal 42 changes to 3 volts, this will result in a 30% duty cycle of the main thyristor 14 for each of these ramp signal pulses. The motor reactor 22 functions to average out the operational cycles of the main thyristor 14 to maintain the proper motor circuit operation for the actual magnitude relationship of the error signal 42 with the ramp signal 46.

The noise source 54 shown in FIG. 3 provides a digital frequency output 56 that is changed by the digital-to-analog converter 58 into an analog signal having a magnitude proportional to the frequency difference above or below the predetermined frequency of the output signal 27 from the crystal oscillator. This gives a percentage deviation above or below that predetermined frequency and for each cycle of the output signal 27 the noise source 54 determines what the deviation will be and for the long term the crystal oscillator frequency is followed and this deviation averages out to be zero.

Figure 5:
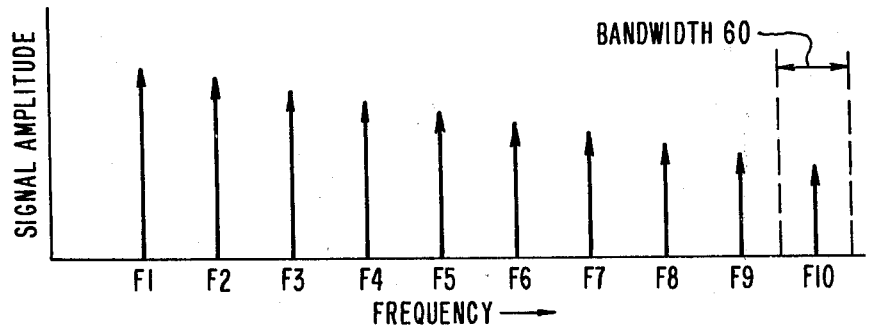
FIG. 5 illustrates the chopper noise harmonic frequencies in relation to one vehicle control signal filter bandpass.

In FIG. 5 there is shown the typical harmonic noise signals provided by the propulsion motor chopper control apparatus shown in FIG. 1. If the base frequency noise pulse F1 is 218 hertz, the chopper also supplies noise pulses F2, F3, and so forth at integer multiples of that base frequency F1. At some upper harmonic, such as F10, it is likely that the noise pulse F10 occurs within the bandwidth 60 used for vehicle speed control signalling such as described in above U.S. Pat. No. 3,810,161.

Figure 6:
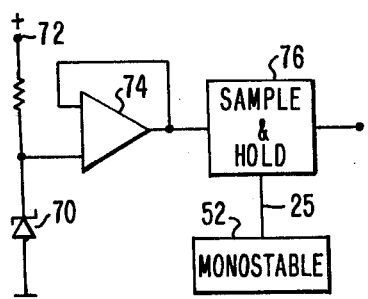
FIG. 6 shows a well known prior art noise signal source.

In FIG. 6 there is shown a well known prior art random noise source, including a zener diode 70 operative with the voltage source 80 which is determined to be above the zener breakdown voltage of the zener diode 70 and followed by an amplifier 74 which amplifies the well known voltage variations adjacent to the breakdown knee of the zener diode device 70. A well-known sample and hold 76 can be operative to provide an output signal in response to each frequency cycle of the monostable 52.

Figure 7:
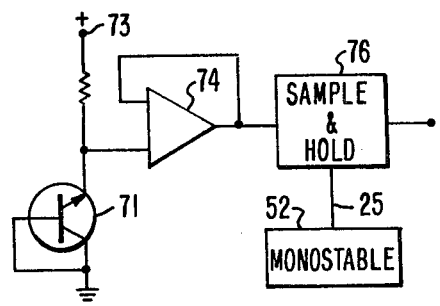
FIG. 7 shows another well known prior art noise signal source.

In FIG. 7 there is shown another well known random noise source generator, including an NPN junction type transistor which is reverse connected in relation to a voltage source 73 and followed by an amplifier 74 and a sample and hold 76 that is responsive to each frequency cycle of operation of the monostable 52.

The main thyristor 14 of the chopper apparatus shown in FIG. 3 runs at a predetermined base frequency F1, such as 218 hertz, and supplies noise at the base frequency F1 and at each harmonic of F1 up through the higher harmonic. At some harmonics such as the tenth where the frequency is within the band of frequencies used for vehicle control signalling, the noise signal strength falls in relation to the base frequency F1 noise component, but there is still an objectionable magnitude harmonic in the signalling band of frequencies. The harmonic signals are amplitude modulated in accordance with the phase angle of the chopper 10, how fast the car is going through a given signal block and the location of the car within that signal block in relation to the vehicle control signal receiving antenna. It is difficult to practically miss each and every particular control signal frequency filter bandpass since more than one frequency control signal is used for signalling and it is not practical to select one optimum chopper base frequency to miss all of the utilized signal filter bandpass frequency regions of a typical transit system.

In FIG. 8, there is shown one suitable noise source 54, where a plurality of memory locations of a digital computer, such as a well-known Intel 8080 microprocessor, are utilized to function as shift registers 80, 82 and 84. A control program shown in the attached Appendix is executed to shift the stored data in the memory registers 0, 1 and 2. The fifth data bit stored in register 0 and the twenty third data bit stored in register 2 are shown fed back to the input of the first register 0 through the exclusive OR 86. The random number bits stored in the last register 2 are supplied to a digital to analog converter 88 to provide an output analog voltage signal 56 that is equal to the random number stored in the last register 2. This voltage signal 56 operates the switch 31 of the sawtooth generator 30 to deviate the ramp signal 46 in relation to the operational frequency of the main thyristor 14. As described in an article entitled, Generation of Delayed Replicas of Maximal Length linear Binary Sequences in the Proceedings of IEEE, Volume III, No. 11, November 1964 at pages 1803 to 1807, any length random number generator can be provided in accordance with the illustration of FIG. 8.

Figure 9:
FIG. 9 shows a control program flow chart for the noise source of FIG. 8.

In FIG. 9, there is shown a flow chart of the control program operative with the noise source 54 shown in FIG. 8.

The present invention provides for the scrambling or randomizing of the fundamental base frequency of the chopper 10 in accordance with a provided random noise signal 56 to reduce the power of the resulting harmonic chopper noise components. This lowers all of the noise component peaks and provides some noise at substantially all frequencies since the chopper frequency keeps changing across a predetermined deviation band of random frequencies and the resulting harmonic noise is discontinuously spread in relation to the same band as the fundamental frequency. At especially the higher frequencies of interest and within the range of known vehicle control signal frequencies, the harmonic noise becomes more or less overlapping and continuous to reduce the average values of the noise harmonic peaks. The harmonic noise signal power in the band of a given bandpass control signal filter is randomly distributed and depending upon the filter characteristics, the filter will not see a coherent signal and will even do some filtering on the chopper harmonic noise itself. Actual tests have been made to establish that the resulting drop in the harmonic noise signal is at least 6 db and could be considerably more than that as determined by a given real time transit system operation.

The illustrated bandpass 60 of the signal filter as shown in FIG. 5 is indicated as a width and is not intended to indicate signal amplitude relationships. The amplitude of the chopper caused harmonic noise will depend upon how far the vehicle carried chopper apparatus is from the signal receiving antenna for a given track signal block. This is a dynamic situation determined by the movement of the vehicle in that signal block. As a vehicle enters a given signal block, the received noise power increases as a vehicle moves in a direction toward and becomes closer to the signal receiver antenna at the opposite end of the signal block. The vehicle occupancy detection signal level is injected into a given track signal block at about 100 milliamps, and it is desired that the chopper noise harmonic signals stay at least 20 db below that occupancy signal level. The frequency width of each signal filter bandpass is predetermined and it is desired that the chopper noise level within a particular filter bandpass frequency be held at least 20 db below the occupancy signal amplitude within that same bandpass frequency. A signal reduction of 20 db is about 1/100 of the signal strength, so this would be a chopper harmonic noise signal of less than 1 milliamp within a given signal bandpass frequency. With no vehicle within a given track signal block, the injected 100 milliamp occupany signal is received at the sensing antenna at substantially that same amplitude, but when a vehicle enters the signal block, the vehicle wheels short across the two-track rails and keep the occupancy signal provided by the signal transmitting antenna from having a predetermined minimum threshold value when sensed by the receiving antenna for establishing vehicle occupancy of that signal block. However, the noise signal injected into that signal block from the vehicle chopper should be kept below the 1 milliamp level so that the chopper noise is not received by the receiving antenna to incorrectly indicate that a vehicle does not occupy that signal block since the control signal receiver might otherwise sense a signal within that signal block above the predetermined threshold value. A well-known threshold circuit is operative with the receiving antenna and control signal receiver and the provided predetermined minimum threshold is typically in the order of 60 milliamps. If the chopper noise injected into the signal block is above that 60 milliamp level and within the frequency of the control signal bandpass filter, the threshold circuit would provide an output signal to falsely indicate that the signal block was not occupied by a vehicle.

This would be an unsafe condition of operation in regard to required transit system safety. With the vehicle in the signal block and without the chopper noise signal there is not a 60 milliamp control signal sensed by the receiving antenna and control signal receiver.

In accordance with the present invention, the chopper harmonic noise injected into the signal block occupied by the vehicle is reduced in amplitude such that there will not be an adequate threshold signal amplitude within the control signal filter bandpass for the threshold circuit in response to this noise to provide an output signal to indicate falsely that there is no vehicle occupancy of the given signal block. By randomizing the chopper noise source, this lowers the chopper noise amplitude in relation to the known frequency bandpass of each signal receiver filter that is trying to sense the control signal frequency to determine signal block occupancy by a vehicle.

The ramp generator 30 permits keeping the on/off ratio or duty cycle of the chopper 10 at the proper level and not changed by the operation of the random noise apparatus 54 and 58. The random noise circuit 54 can be implemented by a programmed digital computer as shown in FIG. 8 to include a shift register of length N that is coupled to feedback data to the input of the shift register for generating a pseudo random sequence, with computer memory locations comprising the register and to give different lengths of the ramp signal 46 as a function of the random noise output level. The height of the ramp signal 46 provided by the sawtooth generator 30 remains the same and reaches the same voltage of 10 volts. Thus if the phase angle controller error circuit 38 is set for 5 volts to provide a 50% duty cycle, this gives a varying chopper operational period as determined by the length of the ramp signal 46 and equal ON and OFF periods to give a 50% duty cycle. The height of the ramp signal 46 is always the same and a given voltage level in the error signal 42 will give the desired ON/-OFF duty cycle periods. The phase lock loop 50 takes the crystal oscillator frequency and compares this with the feedback ramp signal frequency to generate an output to maintain the desired long time average relationship of these two frequencies the same.

In the prior art control apparatus shown in FIG. 1, the signal 46 was reset to zero for every ON pulse from crystal oscillator 26 and then ramped up to 10 volts when another ON pulse would occur. If a 5 volt input error signal 42 was input to the comparator 44, a 50% duty cycle for the main thyristor 14 would result, since the chopper OFF control pulse was determined by where the ramp signal crosses the 5 volt input error signal 42.

To keep from disturbing the normal operation of the chopper apparatus with the randomized time base of the present invention, it is desired to keep the previous ON/OFF ratio for the chopper apparatus the same for a given error signal magnitude. If the random noise source 54 will make the ramp signals 46 longer or shorter in response to the noise source output signal 56 and a 5 volt error signal will always give a 50% chopper duty cycle no matter if the ramp signal 46 has been lengthened or shortened, and the average of the random signal length changes will be the same ramp length that would occur without the operation of the random generator 54, a stable operation of the main thyristor 14 will result. This causes the chopper generated noise harmonics to be randomly scrambled but the rest of the control apparatus for the chopper 10 sees the proper duty cycle. For shorter time period, the repetition rate is faster but the duty cycle of OFF operation with respect to the ON operation of the main thyristor 14 should remain the same. The provided noise source output 56 controls the distance between the ON control pulse 27 and the OFF control pulse 48 for the main thyristor 14.

The frequency of the chopper 10 does not determine the average motor armature voltage but rather it is the ON/OFF duty time ratio of the chopper 10. As the ramp signal frequency is scrambled, when a 50% duty cycle is required by the transit vehicle operating conditions and requested by the P signal 28, the same 50% duty cycle will still be provided after the random scrambling of the chopper noise frequency. The motor armature average voltage is determined by the effective duty cycle of the chopper main thyristor 14.

APPENDIX

| A ASSEMBLY EXAMPLE | | | |
|---|---|---|---|
| RAND: | PUSH | B | ; Save B&C Registers |
| | LOA | MEMORY 0 | ; First Do Exclusive Or |
| | RAR | | |
| | RAR | | |
| | RAR | | ; "S" In Bit 0 |
| | MOV | B A | ; Store in Temporary B |
| | LOA | MEMORY 2 | |
| | RAR | | ; "23" in Bit 0 |
| | XRA | B | ; Exclusive Or Bit "0" With Temporary |
| | RAR | | ; Move Result Into Carry Bit |
| | LOA | MEMORY 0 | |
| | RAR | | ; Carry To A7 "1"), A0 ("8") To Carry |
| | STA | MEMORY 0 | ; Store New Memory 0 |
| | LOA | MEMORY 1 | |
| | RAR | | ; Carry ("8") to A7 ("9"), A0 ("16") To Carry |
| | STA | MEMORY 1 | ; Store New Memory 1 |
| | LOA | MEMORY 2 | |
| | RAR | | ; Carry ("16") To A7 ("17"); Carry Will Be Thrown Away |
| | STA | MEMORY 2 | ; Store New Memory 2 |
| | OUT | "DIA" | ; Output To D/A Converter |
| | POP | B | ; Restore B&C Registers |
| | RET | | ; Return to Main Program |

What I claim is:

1. In control apparatus for a motor operative with a power supply and in relation to a control signal within a known frequency bandwidth, the combination of:
   switch means coupled between the power supply and the motor and having a duty cycle for determining the average operation of the motor;

means providing a first signal having a reference frequency and a predetermined magnitude;

means providing a motor operation error signal having a magnitude in response to at least one of the actual operation of the motor and a desired operation for said motor;

means coupled with the switch means for determining said duty cycle and the average operation of said motor in accordance with a comparison of the magnitude of said first signal and the magnitude of said error signal; and means coupled with the first signal providing means for providing a predetermined deviation of said reference frequency.

2. The control apparatus of claim 1, with said predetermined deviation of the reference frequency changing for each operational cycle of said switch means and having a substantially zero average deviation when considered over a plurality of operational cycles of said switch means.

3. The control apparatus of claim 1:
with the first signal comprising a ramp having a substantially constant magnitude; and
with the magnitude of the error signal having a percentage relationship with the ramp magnitude in accordance with the difference between the actual operation of the motor and the desired operation of the motor.

4. The control apparatus of claim 1, with the first signal means controlling the operational cycles of the switch means and with the predetermined deviation providing means including a random signal source for modifying said reference frequency for each operational cycle of the switch means.

5. The control apparatus of claim 1, with said predetermined deviation of the reference frequency reducing the average noise signal generated by said switch means for each operational cycle of said switch means in relation to the known frequency bandwidth of said control signal.

6. The control apparatus of claim 1, including means for sensing the actual current of said motor and with the actual operation of the motor being in accordance with the sensed motor current supplied to the motor by said switch means.

7. In the method of controlling the current supplied to a vehicle propulsion motor from a power source in relation to a vehicle control signal within a known frequency bandwidth, the steps of:
determining the average current supplied to said motor in accordance with the duty cycle of a switching device;
providing a reference signal having a predetermined frequency and a first magnitude to determine the operation frequency of the switching device;
providing a motor current signal having a second magnitude for comparison with said first magnitude to determine the duty cycle of the switching device, with said second magnitude being responsive to the actual current of the motor; and
providing a predetermined frequency variation of the reference signal in a random manner such that the average variation of that frequency is substantially zero over an extended time period.

8. The method of claim 7, with the second magnitude having a percentage relationship to the first magnitude for determining said duty cycle.

9. The method of claim 7, with said predetermined frequency variation reducing any harmonic signal noise resulting from the switching device in relation to said known frequency bandwidth without changing the duty cycle of the switching device.

10. The method of claim 7, with the second magnitude of the error signal being less than and having a percentage relationship with the first magnitude of the reference signal to determine the duty cycle of the switching device.

* * * * *